(12) United States Patent
Seo et al.

(10) Patent No.: US 7,747,133 B2
(45) Date of Patent: Jun. 29, 2010

(54) RECORDING MEDIUM HAVING DATA STRUCTURE FOR MANAGING REPRODUCTION OF STILL IMAGES FROM A CLIP FILE RECORDED THEREON AND RECORDING AND REPRODUCING METHODS AND APPARATUSES

(75) Inventors: Kang Soo Seo, Kyunggi-do (KR); Sung Wan Park, Suwon-si (KR); Byung Jin Kim, Kyunggi-do (KR); Soung Hyun Um, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1604 days.

(21) Appl. No.: 10/656,335

(22) Filed: Sep. 8, 2003

(65) Prior Publication Data

US 2004/0109676 A1    Jun. 10, 2004

(30) Foreign Application Priority Data

Sep. 7, 2002    (KR)    ...................... 10-2002-0054044

(51) Int. Cl.
 *H04N 7/00*    (2006.01)
(52) U.S. Cl. .......................... 386/95; 386/125; 386/126
(58) Field of Classification Search .................. 386/95, 386/125, 126
See application file for complete search history.

(56) References Cited

U.S. PATENT DOCUMENTS

| | | |
|---|---|---|
| 4,164,760 A | 8/1979 | Inaba et al. |
| 5,854,873 A | 12/1998 | Mori et al. |
| 5,870,523 A | 2/1999 | Kikuchi et al. |
| 5,884,004 A | 3/1999 | Sato et al. |
| 5,907,658 A | 5/1999 | Murase et al. |
| 5,999,698 A | 12/1999 | Nakai et al. |
| 6,122,436 A | 9/2000 | Okada et al. |
| 6,148,138 A | 11/2000 | Sawabe et al. |
| 6,157,769 A | 12/2000 | Yoshimura et al. |
| 6,266,483 B1 | 7/2001 | Okada et al. |
| 6,285,826 B1 * | 9/2001 | Murase et al. ............... 386/125 |
| 6,308,005 B1 | 10/2001 | Ando et al. |
| 6,341,196 B1 | 1/2002 | Ando et al. |
| 6,353,702 B1 | 3/2002 | Ando et al. |
| 6,369,835 B1 | 4/2002 | Lin |
| 6,374,037 B1 | 4/2002 | Okada et al. |
| 6,385,389 B1 | 5/2002 | Maruyama et al. |

(Continued)

FOREIGN PATENT DOCUMENTS

AU    6672298    9/1998

(Continued)

OTHER PUBLICATIONS

Chinese Office Action dated Jun. 29, 2007.

(Continued)

*Primary Examiner*—Thai Tran
*Assistant Examiner*—Girumsew Wendmagegn
(74) *Attorney, Agent, or Firm*—Harness, Dickey & Pierce, PLC

(57) ABSTRACT

The recording medium includes a navigation area having navigation information recording therein. The navigation information indicates a portion of a clip file, which includes video data, to display as a still image and a duration to display the still image.

33 Claims, 10 Drawing Sheets

U.S. PATENT DOCUMENTS

| | | |
|---|---|---|
| 6,393,430 B1 | 5/2002 | Van Ryzin |
| 6,400,893 B1 | 6/2002 | Murase et al. |
| 6,442,337 B1 | 8/2002 | Okada et al. |
| 6,470,460 B1 | 10/2002 | Kashiwagi et al. |
| 6,493,504 B1 | 12/2002 | Date et al. |
| 6,529,683 B2 | 3/2003 | Mori et al. |
| 6,532,335 B2 | 3/2003 | Otomo et al. |
| 6,574,419 B1 | 6/2003 | Nonomura et al. |
| 6,580,870 B1 | 6/2003 | Kanazawa et al. |
| 6,594,442 B1 | 7/2003 | Kageyama et al. |
| 6,748,415 B1 | 6/2004 | Sugimoto |
| 6,798,976 B2 | 9/2004 | Tsumagari et al. |
| 6,816,189 B2 | 11/2004 | Nagaoka et al. |
| 6,823,010 B1 | 11/2004 | Curet et al. |
| 6,829,211 B2 | 12/2004 | Sako et al. |
| 6,856,756 B1 | 2/2005 | Mochizuki et al. |
| 6,919,925 B2 | 7/2005 | Kudo |
| 6,943,684 B2 | 9/2005 | Berry |
| 6,975,363 B1 | 12/2005 | Baldwin et al. |
| 6,992,710 B2 | 1/2006 | Nagaoka |
| 6,999,674 B1 | 2/2006 | Hamada et al. |
| 7,054,545 B2 | 5/2006 | Ando et al. |
| 7,158,175 B2 | 1/2007 | Belz et al. |
| 7,224,890 B2 | 5/2007 | Kato |
| 7,343,052 B2 | 3/2008 | Roth et al. |
| 2001/0000809 A1 | 5/2001 | Ando et al. |
| 2001/0016112 A1 | 8/2001 | Heo et al. |
| 2001/0043790 A1 | 11/2001 | Saeki et al. |
| 2001/0046371 A1 | 11/2001 | Ando et al. |
| 2001/0056580 A1 | 12/2001 | Seo et al. |
| 2002/0025143 A1 | 2/2002 | Kashiwagi et al. |
| 2002/0035575 A1 | 3/2002 | Taira et al. |
| 2002/0085022 A1 | 7/2002 | Masuda et al. |
| 2002/0110369 A1 | 8/2002 | Mori et al. |
| 2002/0126994 A1 | 9/2002 | Gunji et al. |
| 2002/0127001 A1 | 9/2002 | Gunji et al. |
| 2002/0130896 A1 | 9/2002 | Spence et al. |
| 2002/0135607 A1 | 9/2002 | Kato et al. |
| 2002/0135608 A1 | 9/2002 | Hamada et al. |
| 2002/0145702 A1* | 10/2002 | Kato et al. ............ 352/1 |
| 2002/0164152 A1 | 11/2002 | Kato et al. |
| 2002/0172496 A1 | 11/2002 | Gunji et al. |
| 2002/0176695 A1 | 11/2002 | Sawabe et al. |
| 2003/0014760 A1 | 1/2003 | Yamauchi et al. |
| 2003/0235406 A1 | 12/2003 | Seo et al. |
| 2004/0047607 A1 | 3/2004 | Seo et al. |
| 2004/0057700 A1 | 3/2004 | Okada et al. |
| 2004/0081434 A1 | 4/2004 | Jung et al. |
| 2004/0141436 A1 | 7/2004 | Monahan |
| 2004/0179820 A1 | 9/2004 | Kashiwagi et al. |
| 2004/0184780 A1 | 9/2004 | Seo et al. |
| 2004/0213552 A1 | 10/2004 | Kato |
| 2005/0019007 A1 | 1/2005 | Kato et al. |
| 2005/0025461 A1 | 2/2005 | Kato et al. |
| 2005/0066352 A1 | 3/2005 | Herley |
| 2005/0105888 A1 | 5/2005 | Hamada et al. |
| 2005/0163463 A1 | 7/2005 | Schick et al. |
| 2005/0196143 A1 | 9/2005 | Kato et al. |
| 2005/0201718 A1 | 9/2005 | Kato |
| 2005/0254363 A1 | 11/2005 | Hamada et al. |
| 2006/0188223 A1 | 8/2006 | Ikeda et al. |
| 2006/0195633 A1 | 8/2006 | Plourde, Jr. |
| 2006/0288302 A1 | 12/2006 | Yahata et al. |

FOREIGN PATENT DOCUMENTS

| | | |
|---|---|---|
| AU | 2003282415 | 6/2004 |
| CN | 1240293 | 1/2000 |
| CN | 1245956 | 3/2000 |
| CN | 1245957 | 3/2000 |
| CN | 1263672 | 8/2000 |
| CN | 1063863 | 3/2001 |
| CN | 1300022 | 6/2001 |
| CN | 1303094 | 7/2001 |
| CN | 1304533 A | 7/2001 |
| CN | 1381137 | 11/2002 |
| DE | 69907758 | 2/2004 |
| DE | 60002774 | 3/2004 |
| EP | 0856849 | 8/1998 |
| EP | 0949825 | 10/1999 |
| EP | 0978994 | 2/2000 |
| EP | 1003337 | 5/2000 |
| EP | 1041566 | 10/2000 |
| EP | 1045393 | 10/2000 |
| EP | 1056092 | 11/2000 |
| EP | 1056094 | 11/2000 |
| EP | 1102270 | 5/2001 |
| EP | 1113439 | 7/2001 |
| EP | 1128386 | 8/2001 |
| EP | 0942609 | 10/2001 |
| EP | 1198133 A1 | 4/2002 |
| EP | 1204269 | 5/2002 |
| EP | 1286544 | 2/2003 |
| EP | 1300851 | 4/2003 |
| EP | 1550121 | 7/2005 |
| FR | 2581771 | 11/1986 |
| GB | 2119151 | 4/1982 |
| GB | 2359210 | 8/2001 |
| JP | 01-300777 | 12/1989 |
| JP | 1-300777 | 12/1989 |
| JP | 5-137144 | 6/1993 |
| JP | 06-311481 | 11/1994 |
| JP | 07-057436 | 3/1995 |
| JP | 07-262646 | 10/1995 |
| JP | 1997-017101 | 1/1997 |
| JP | 9-252450 | 9/1997 |
| JP | 9-261584 | 10/1997 |
| JP | 10-154373 | 6/1998 |
| JP | 11-213628 | 8/1999 |
| JP | 2000-004421 | 1/2000 |
| JP | 2000-020554 | 1/2000 |
| JP | 2000-041212 | 2/2000 |
| JP | 2000-059714 | 2/2000 |
| JP | 2000-251402 | 9/2000 |
| JP | 2000-286537 | 9/2000 |
| JP | 2000-333126 | 11/2000 |
| JP | 2001-052467 | 2/2001 |
| JP | 2001-069460 | 3/2001 |
| JP | 2001-078123 | 3/2001 |
| JP | 2001-086458 | 3/2001 |
| JP | 2001-103417 | 4/2001 |
| JP | 2001-155466 | 6/2001 |
| JP | 2001-157155 | 6/2001 |
| JP | 2001-167529 | 6/2001 |
| JP | 2001-216739 | 8/2001 |
| JP | 2001-231015 | 8/2001 |
| JP | 2001-285772 | 10/2001 |
| JP | 2002-56651 | 2/2002 |
| JP | 2002-82684 | 3/2002 |
| JP | 2002-158965 | 5/2002 |
| JP | 2002-158972 | 5/2002 |
| JP | 2002-208258 | 7/2002 |
| JP | 2002-325221 | 11/2002 |
| JP | 2002-354424 | 12/2002 |
| JP | 2003-016764 | 1/2003 |
| JP | 2003-045154 | 2/2003 |
| JP | 2003-299015 | 10/2003 |
| JP | 2004-336566 | 11/2004 |
| KR | 1998-0086030 | 12/1998 |
| KR | 1999-0070106 | 9/1999 |
| KR | 10-2000-0002840 | 1/2000 |
| KR | 10-2000-0002921 | 1/2000 |
| KR | 10-2000-0002922 | 1/2000 |
| KR | 10-2000-0014419 | 3/2000 |

| | | |
|---|---|---|
| KR | 10-2000-0018987 | 4/2000 |
| KR | 10-2001-0013565 | 2/2001 |
| KR | 10-2001-0021485 | 3/2001 |
| KR | 10-2001-0027114 | 4/2001 |
| KR | 010051295 | 6/2001 |
| KR | 10-2001-0066211 | 7/2001 |
| KR | 10-2002-0021402 | 3/2002 |
| KR | 10-2002-0064463 | 8/2002 |
| KR | 10-2003-0064546 | 8/2003 |
| RU | 2229174 | 5/2004 |
| TW | 517495 | 1/2003 |
| WO | WO 98/37699 | 8/1998 |
| WO | WO 99/53694 | 10/1999 |
| WO | WO 00/33532 | 6/2000 |
| WO | WO 00/55857 | 9/2000 |
| WO | WO 00/060598 | 10/2000 |
| WO | WO 00/074061 | 12/2000 |
| WO | WO 01/11626 | 2/2001 |
| WO | WO 01/82608 | 11/2001 |
| WO | WO 02/062061 | 8/2002 |
| WO | WO 2004/023234 | 3/2004 |
| WO | WO 2004/023484 | 3/2004 |
| WO | WO 2004/023485 | 3/2004 |
| WO | WO 2004/066281 A1 | 8/2004 |
| WO | WO 2004/075194 A1 | 9/2004 |
| WO | WO 2004/086396 A1 | 10/2004 |

OTHER PUBLICATIONS

Russian Office Action dated Sep. 18, 2007.
European Telecommunications Standards Institute, "*Digital Video Broadcasting (DVB): Subtitling systems*", 1997, pp. 1-45.
United States Office Action dated May 29, 2008.
Japanese Office Action dated May 20, 2008.
European Office Action dated May 16, 2008.
Japanese Office Action dated Jun. 10, 2008.
Japanese Office Action dated Jun. 20, 2008.
United States Office Action dated Jul. 9, 2008.
European Search Report dated Sep. 1, 2008.
European Search Report dated Jul. 30, 2008.
"Information technology—Generic coding of moving pictures and associated audio information: Systems", Jan. 12, 2000.
Japanese Office Action dated Sep. 24, 2008.
Japanese Office Action dated Sep. 16, 2008.
Chinese Office Action dated Aug. 8, 2008.
Chinese Office Action dated Oct. 31, 2008.
Chinese Office Action dated Dec. 5, 2008 with English translation.
United States Office Action dated Sep. 1, 2009.
Japanese Office Action dated Oct. 20, 2009 with English translation.
Canadian Office Action dated Dec. 10, 2009.
United States Office Action dated Feb. 4, 2010 for corresponding U.S. Appl. No. 10/716,629.

\* cited by examiner

```
PlayListMark(){
    length
    number_of_PlayList_marks
    for(i=0; j<number_of_PlayList_marks;j++){
        - - - - -
        mark_type
        - - - - -
        mark_time_stamp

- - - duration
        makers_information
        maker_name
        }
}
```

FIG. 8A

```
PlayItem(){
    length
    Clip_Information_file_name
    Clip_codec_identifier
    if (CPI_type = 1)
        ref_to_STC_id
              ⋮
    IN_time
    Duration(Out_time)
              ⋮
    }
}
```

FIG. 8B

```
PlayItem(){
    length
    Clip_Information_file_name
    Clip_codec_identifier
    if (CPI_type = 1)
        ref_to_STC_id

⋮

IN_time
Out_time
              ⋮
}
if (<Still-Image>) {
    number_of_still_images
    for (i=0; i<number_of_still_images; i++){
        duration
        display_timing_mode
        display_order_mode
        display_effect_mode
        display_effect_period
    }
  }
}
```

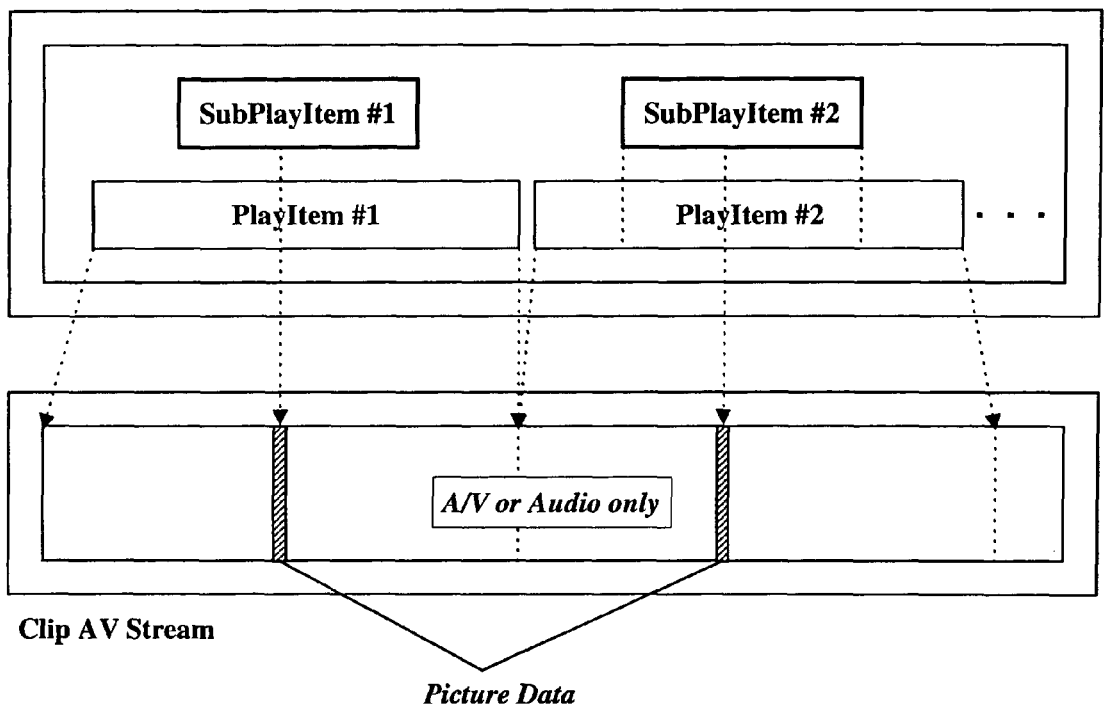

RECORDING MEDIUM HAVING DATA STRUCTURE FOR MANAGING REPRODUCTION OF STILL IMAGES FROM A CLIP FILE RECORDED THEREON AND RECORDING AND REPRODUCING METHODS AND APPARATUSES

FOREIGN PRIORITY

The present invention claims priority under 35 U.S.C. 119 on Korean Application Nos. 2002-54044 filed Sep. 7, 2002, the contents of which are incorporated by reference in their entirety.

BACKGROUND OF THE INVENTION

1. Field of the Invention

The present invention relates to a recording medium having a data structure for managing reproduction of at least still images recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (BD-RE) and Blu-ray Disk ROM (BD-ROM) are examples of these new optical disks.

The standardization for high-density read-only optical disks such as the Blu-ray ROM (BD-ROM) is still under way. An effective data structure for managing reproduction of still images recorded on the high-density read-only optical disk such as a BD-ROM is not yet available.

SUMMARY OF THE INVENTION

The recording medium according to the present invention includes a data structure for managing reproduction of at least still images recorded on the recording medium.

In one exemplary, a navigation area of the recording medium includes navigation information indicating a portion of a clip file, which includes video data, to display as a still image and a duration to display the still image. For example, in one exemplary embodiment, a playlist area of the recording medium includes at least one playlist directory, and a playlist in the playlist directory includes the navigation information.

In one exemplary embodiment, the playlist includes one of a playitem field and a sub-playitem field providing the navigation information for the still image. In another exemplary embodiment, the playlist includes at least one playlist mark pointing to the still image in the clip file.

In a further exemplary embodiment, the navigation information indicates whether to display the still image for one of a finite and an infinite period of time. In a still further exemplary embodiment, if the navigation information indicates to display the still image for a finite period of time, the finite length of time to display the still image is provided.

The present invention further provides apparatuses and methods for recording and reproducing the data structure according to the present invention.

BRIEF DESCRIPTION OF THE DRAWINGS

The above features and other advantages of the present invention will be more clearly understood from the following detailed description taken in conjunction with the accompanying drawings, in which:

FIG. 8 illustrates an exemplary embodiment of the playitem information field according to the present invention;

FIG. 9 illustrates another exemplary embodiment of managing still images according to the present invention;

FIG. 10 illustrates an exemplary embodiment of the subplayitem information field according to the present invention;

DESCRIPTION OF THE PREFERRED EMBODIMENTS

In order that the invention may be fully understood, exemplary embodiments thereof will now be described with reference to the accompanying drawings.

Figure 1:
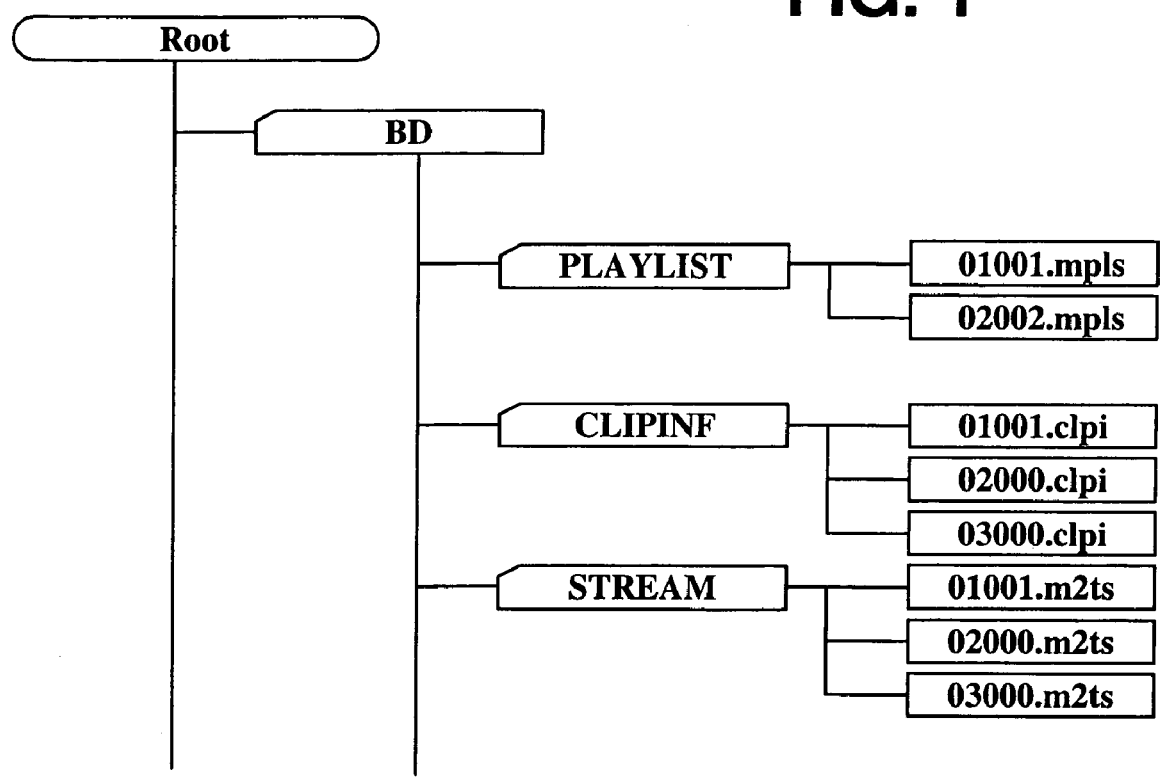
FIG. 1 illustrates an exemplary embodiment of a recording medium file or data structure according to the present invention.

A high-density optical disk, for example, a Blu-Ray ROM (BD-ROM), BD-RE, etc. in accordance with the invention may have a file or data structure for managing reproduction of video and audio data as shown in FIG. 1. Some aspects of the data structure according to the present invention shown in FIG. 1 are the same as the well-known BD-RE standard, as such these aspects will not be described in great detail.

As shown in FIG. 1, the root directory contains at least one BD directory. The BD directory includes general files (not shown), a PLAYLIST directory in which playlist files (e.g., *.mpls) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clips or clip files. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC)

sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

The general information files (not shown) provide general information for managing the reproduction of the A/V streams recorded on the optical disk.

Figure 2:
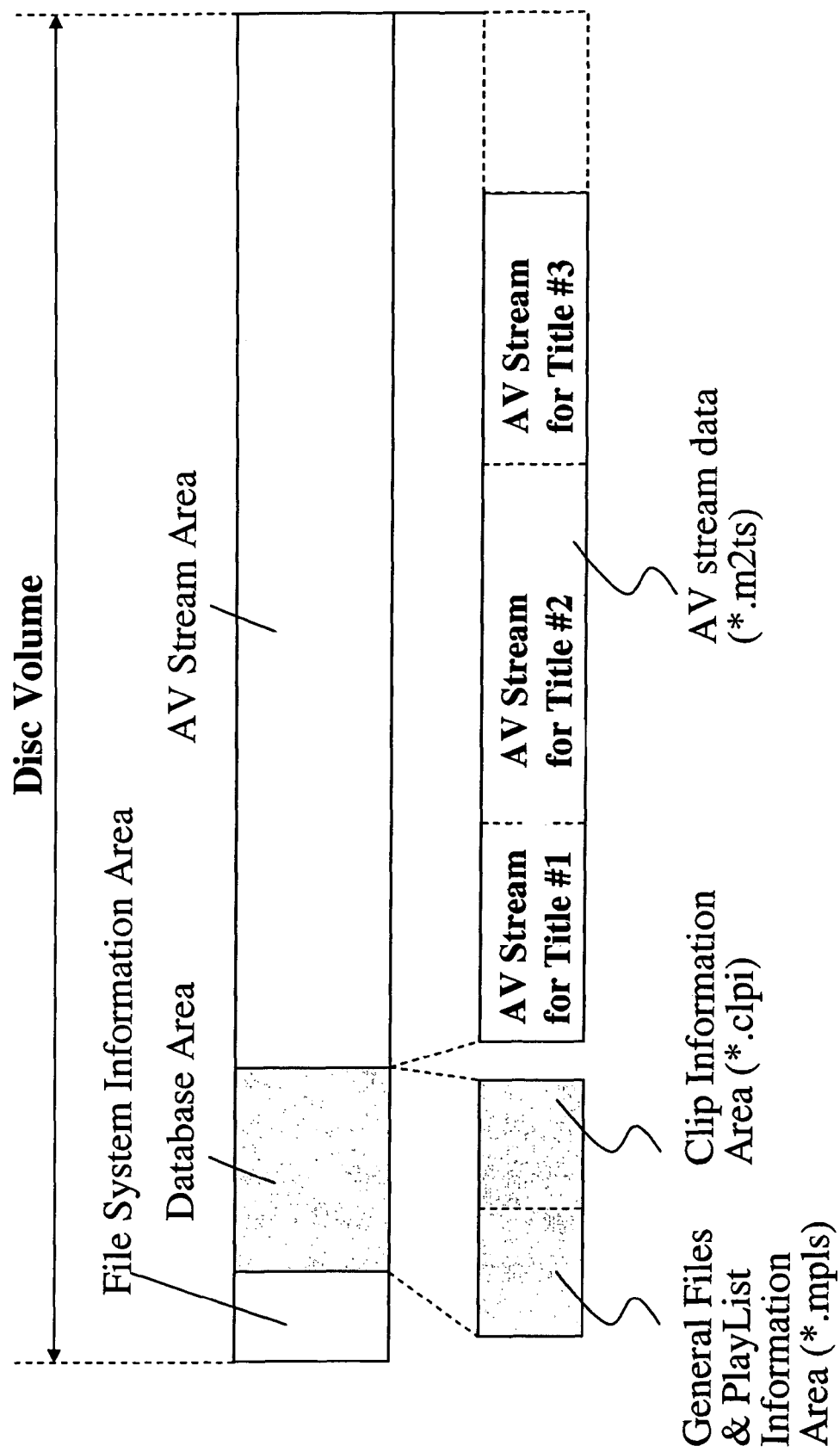
FIG. 2 illustrates an example of a recording medium having the data structure of FIG. 1 stored thereon.

In addition to illustrating the data structure of the recording medium according to an embodiment of the present invention, FIG. 1 represents the areas of the recording medium. For example, the general information files are recorded in one or more general information areas, the playlist directory is recorded in one or more playlist directory areas, each playlist in a playlist directory is recorded in one or more playlist areas of the recording medium, etc. FIG. 2 illustrates an example of a recording medium having the data structure of FIG. 1 stored thereon. As shown, the recording medium includes a file system information area, a data base area and an A/V stream area. The data base area includes a general information file and playlist information area and a clip information area. The general information file and playlist information area have the general information files recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM and BD-RE optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version, camera angle, etc. represents a different reproduction path, and the video data in these instances is referred to as multiple reproduction path video data.

Because of the large storage capacity of the newer, high-density recording media such as BD-ROM still images may be recorded and reproduced in an organized and/or user interactive fashion. The data structure for managing reproduction of still images for a high-density recording medium (e.g., a high density optical disk) in accordance with embodiments of the present invention will be described along with methods and apparatuses according to embodiments of the present invention for recording and reproducing still images.

Figure 3:
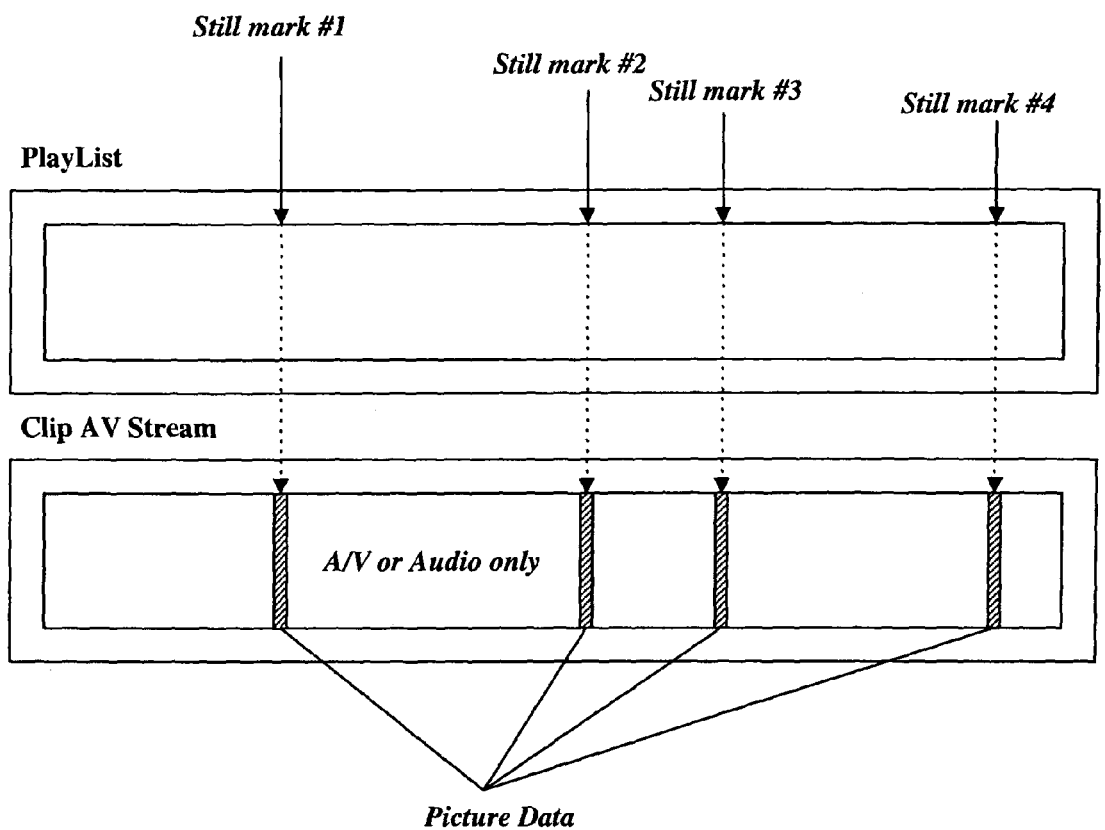
FIG. 3 illustrates one embodiment of managing still images according to the present invention.

FIG. 3 illustrates one embodiment of managing still images according to the present invention. As shown, specific picture data is chosen from the movie data of clip A/V streams recorded on a BD-ROM and set as a still image. The specific picture data is at least one of an I-picture, P-picture, and B-picture. The navigation information for playback control of the still image is created and managed by defining a playlist mark as a mark for the still picture. The playlist mark is referred to as a still mark. The playlist marks are described in greater detail below with respect to FIG. 4.

Figures 4, 5:
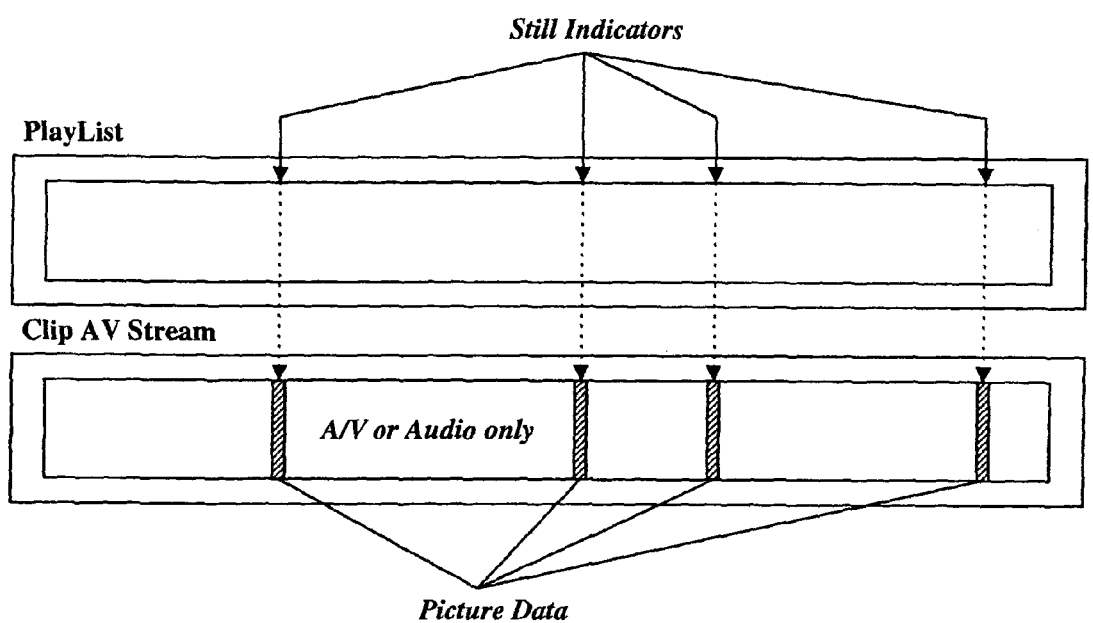
FIG. 4 illustrates one exemplary embodiment of the navigation information for still images provided by associated playlist marks.
FIG. 5 illustrates another exemplary embodiment of managing still images according to the present invention.

FIG. 4 illustrates one exemplary embodiment of the navigation information for still images provided by associated playlist marks. A playlist file includes a playlist mark information field called 'PlayList Mark'. As shown in FIG. 4, the playlist mark 'PlayListsMark' information field indicates a length of the information field and a number of the playlist marks 'number_of_PlayList_marks' in the playlist. In case of the BD-RE, the 'length' field has a value of '26 bytes'. In case of the BD-ROM in accordance with the invention the length field may have a value greater than 26 bytes. For each playlist mark, the playlist mark 'PlayListsMark' information field indicates the mark type 'mark_type', a time stamp 'mark_time_stamp', duration 'duration', maker's information 'makers_information', and maker's name 'maker_name'.

The mark type indicates the type of mark. For example, when a mark indicates the beginning of a chapter, the mark type 'mark_type' identifies the associated mark as a chapter mark. The present invention also includes the mark types of first thumbnail type, second thumbnail type and still. A mark type of 0x01 represents the first thumbnail type of mark, a mark type of 0x02 represents the second thumbnail type of mark, and a mark type of 0x10 represents a still mark. The first and second thumbnail types are the same as the first and second thumbnail types having mark type designations 1x01 and 0x02 in the BD-RE standard. As shown in FIG. 4, if a mark is of the first or second thumbnail type, then a reference to an associated thumbnail image in a menu of thumbnails 'ref_to_menu_thumbnail' is provided. As further shown in FIG. 4, if a mark is of the still type, then a reserved data field 'reserved_for_word_align' is provided.

The time stamp 'mark_time_stamp' of the mark indicates a point where the mark is placed; namely, indicates a point on a time axis of the A/V stream of a clip (e.g., ATC and/or STC basis) where the mark is placed. The 'duration' indicates the length of the mark that starts from the time stamp indicated by the 'mark_time_stamp'. If the mark is a still mark, then the duration 'duration' may indicate a length of time to display the still image. For example, if the field is '0xFF', it indicates a limitless still state, and otherwise it indicates a limited still state.

The maker's information 'maker_information' provides information supplied by the maker, and the maker's name 'maker_name' gives the maker's name.

As demonstrated from the description of FIG. 4, when a mark is a still mark, the information associated with the still mark provides navigation information for reproducing the still image associated with the still mark.

FIG. 5 illustrates another exemplary embodiment of managing still images according to the present invention. As shown, specific picture data is chosen from the movie data of clip A/V streams recorded on a BD-ROM and set as a still image. Then, the navigation information for playback control of the still image is created and managed by defining a still indicator. The still indicator points to the picture data in the clip A/V stream to reproduce as the still image.

Figure 6:
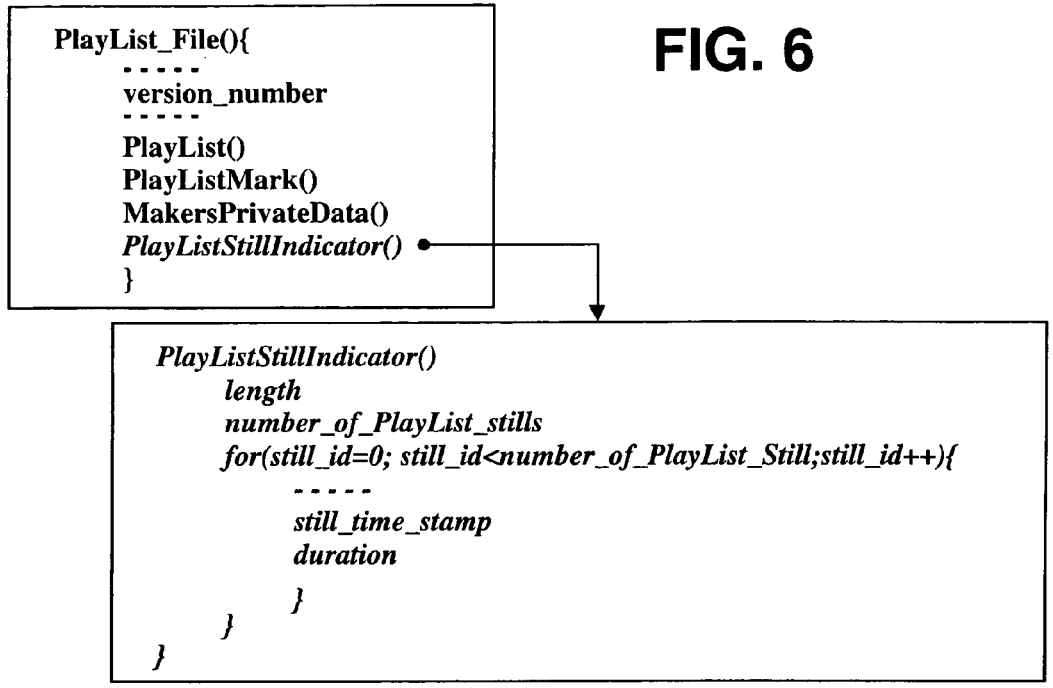
FIG. 6 illustrates an exemplary embodiment of the navigation information for still images provided by a still indicator information field.

As illustrated in FIG. 6, the still indicator 'PlayListStill-Indicator' is a new information field added to a playlist file 'PlayList_File'. This new information field indicates a length of the information field and a number of the playlist stills 'number_of_PlayList_stills'. For each playlist still, the playlist indicator 'PlayListStillIndicator' information field indicates a time stamp 'still_time_stamp', and a duration 'duration'

The time stamp 'still_time_stamp' of the playlist still indicates a point where the playlist still is placed; namely, indicates a point on a time axis of the A/V stream of a clip (e.g., ATC and/or STC basis) where the playlist still is placed. The duration 'duration' indicates a duration to display the still image.

Figure 7A:
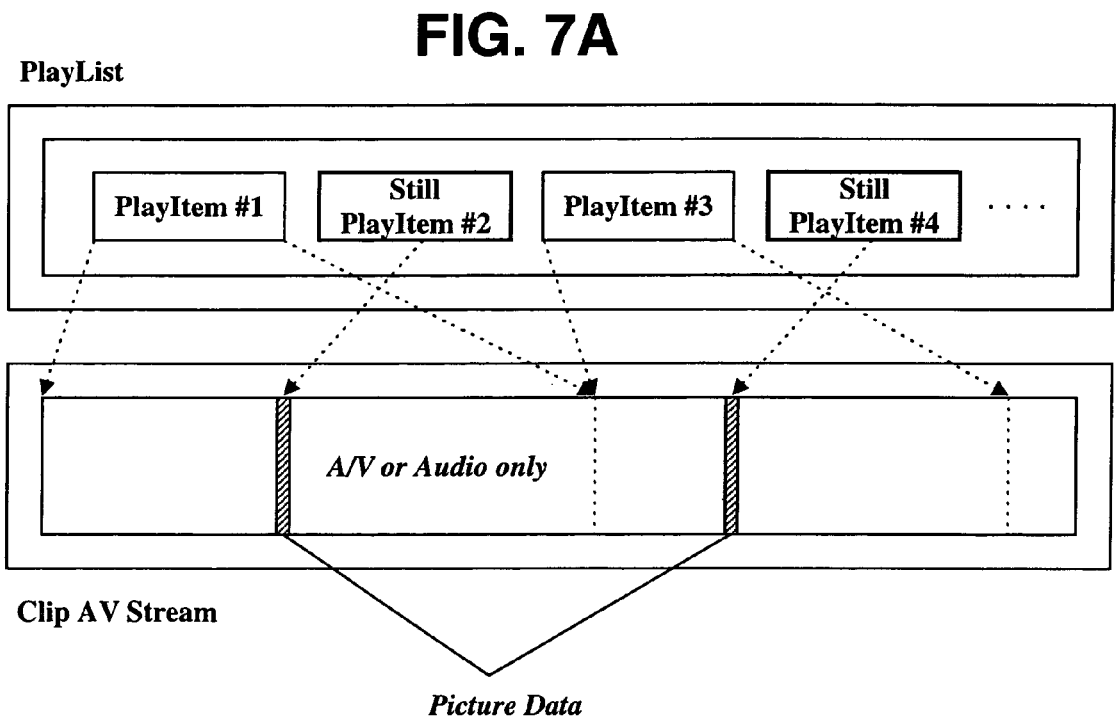
FIG. 7 illustrates a further exemplary embodiment of managing still images according to the present invention.

FIG. 7A illustrates a further exemplary embodiment of managing still images according to the present invention. As shown, specific picture data is chosen from the movie data of clip A/V streams recorded on a BD-ROM and set as a still image. In this embodiment, playitems are used to manage still images. For example, as shown, some playitems manage at least a portion of the clip A/V stream to reproduce, for example, a portion of a movie and some playitems manage the clip A/V stream to reproduce a still image and have been labeled still playitems.

FIG. 8A illustrates an exemplary embodiment of the playitem information field according to the present invention. The playitem 'PlayItem' information field indicates a length of the information field, and indicates the name of the clip information file 'Clip_Information_File_Name' associated with the playitem.

The playitem information field also includes an indicator 'Clip_codec_identifier' indicating whether the playitem is a still playitem.

If the CPI type given in the clip information file associated with the playitem is an EP map type signified by CPI type=1, then the playitem includes an STC reference 'ref_to_STC-id' on the clip indicated by the clip information file name 'Clip-Information_file_name'.

The playitem also includes IN_time and 'duration' or OUT_time fields. The field of 'IN_time' takes up 2 bytes and indicates the position at which displaying of the still picture starts. The field of 'Duration(OUT_time)' takes up 2 bytes and indicates whether the still image is displayed for a limited duration or indefinitely, or alternatively indicates the position at which displaying of the still picture ends.

FIG. 8B illustrates another exemplary embodiment of the playitem information field according to the present invention. As shown, this embodiment is the same as the embodiment of FIG. 8A except that if the playitem is a still playitem (as indicated by "if(still image)", then the number of still images 'number_of_still_images' is provided; and for each still image, the following indicator fields are provided: an indicator of the number of still images associated with the still mark 'number_of_still_images', an indicator of the display timing 'display_timing_mode', an indicator of the display order 'display_order_mode', an indicator of the display effect 'display_effect_mode' and an indicator of the period for the display effect 'display_effect_period'.

If the 'display_timing_mode' field is '0', it indicates an automatic slideshow. If the 'display_timing_mode' field is '1', it indicates a browsable still or slideshow operation, which displays still images based on key input by a user. If the 'display_order_mode' field is '0', it indicates a sequential still operation in which the still images are to be displayed sequentially. If the 'display_order_mode' field is '1', it indicates a random still operation in which the still images are to be displayed in a random manner.

The 'display_effect_mode' indicates the effect to be applied to the still image such as cut-in/cut-out or fade-in/fade-out. The 'display_effect_period' field indicates the time duration for which the corresponding display effect is valid. The fields of 'display_timing_mode', 'display_order_mode', 'display_effect_mode' and 'display_effect_period' can be defined and managed for each still image.

Figure 7B:
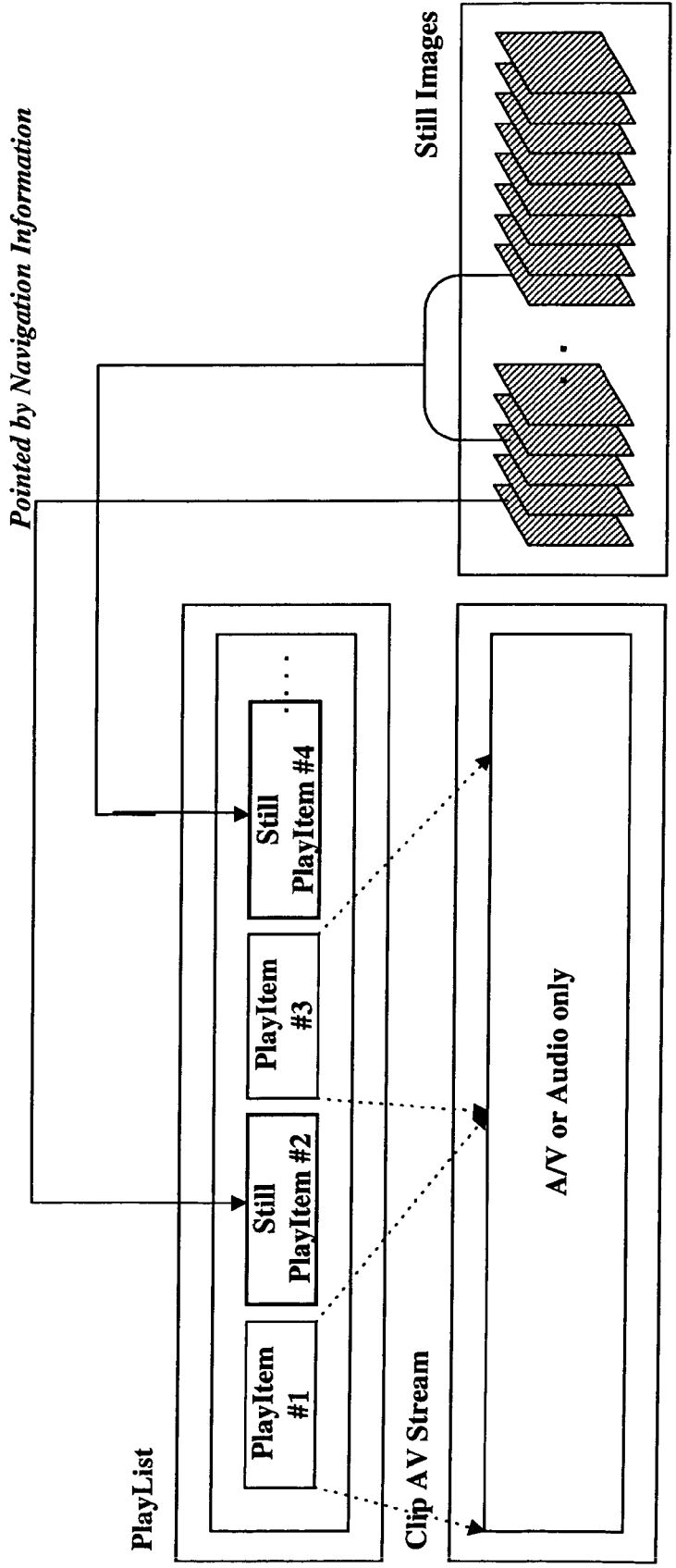

FIG. 7B illustrates another exemplary embodiment of a method for managing still images according to the present invention. In this embodiment, playitems are used to manage one or more still images. For example, as shown, some playitems manage movie video and audio data or only audio data and some playitems manage a still image, a group of still images or slideshow (or portion of a slideshow), and have been labeled still playitems.

The clip A/V stream corresponding to the playlist may contain movie video and audio data together or only audio data. The still images may be stored in a single image file or each still image may be stored in an individual image file. The playitems of the playlist provide navigation information linking the still images and the clip A/V stream. As will be appreciated, the still images and, for example, the audio data are recorded in separate files and managed by separate files. In this manner, the still images and audio data may be reproduced together but independently. This permits, for example, continuously loop through (i.e., repeating) the clip of audio data linked with still images forming a slideshow while the still images are presented.

In the embodiment of FIG. 7B, the playitem may have the structure of, for example, either the embodiment of FIG. 8A or FIG. 8B.

FIG. 9 illustrates another exemplary embodiment for managing still images according to the present invention. As shown, specific picture data is chosen from the movie data of clip A/V streams recorded on a BD-ROM and set as a still image. In this embodiment, sub-playitems are used to manage still images.

FIG. 10 illustrates an exemplary embodiment of the sub-playitem information field according to the present invention. The sub-playitem 'SubPlayItem' information field indicates a length of the information field, and indicates the name of the clip information file 'Clip_Information_File_Name' associated with the sub-playitem.

The sub-playitem information field also includes an indicator 'Clip_codec-identifier' and a type indicator 'SubPlayItem_type', both indicating whether the sub-playitem is a still sub-playitem and associated with a still image. With respect to the type indicator 'SubPlayItem_type', if the type indicator 'SubPlayItem_type' equals, for example, "2", then this indicates the sub-playitem is associated with a sub-path for displaying an associated still image.

The field of 'SubPlayItem_IN_time' takes up 2 bytes and indicates the position at which displaying of the still picture starts. The field of 'Duration(SubPlayItem_OUT_time)' takes up 2 bytes and indicates whether the still image is displayed for a limited duration or indefinitely, or alternatively indicates the position at which displaying of the still picture ends.

The sub-playitem further includes an STC reference 'ref_to_STC_id' for the clip indicated by the clip information file name 'Clip-Information_file_name', an id of the playitem containing this sub-playitem 'sync_Playitem_id', and an indication 'Sync_start_PTS_of_PlayItem' of a presentation-time in the playitem indicated by the 'sync_Playitem_id.'

In an alternative embodiment, the A/V stream is managed by a sub-playitem and the still image is managed by a playitem.

Figure 11:
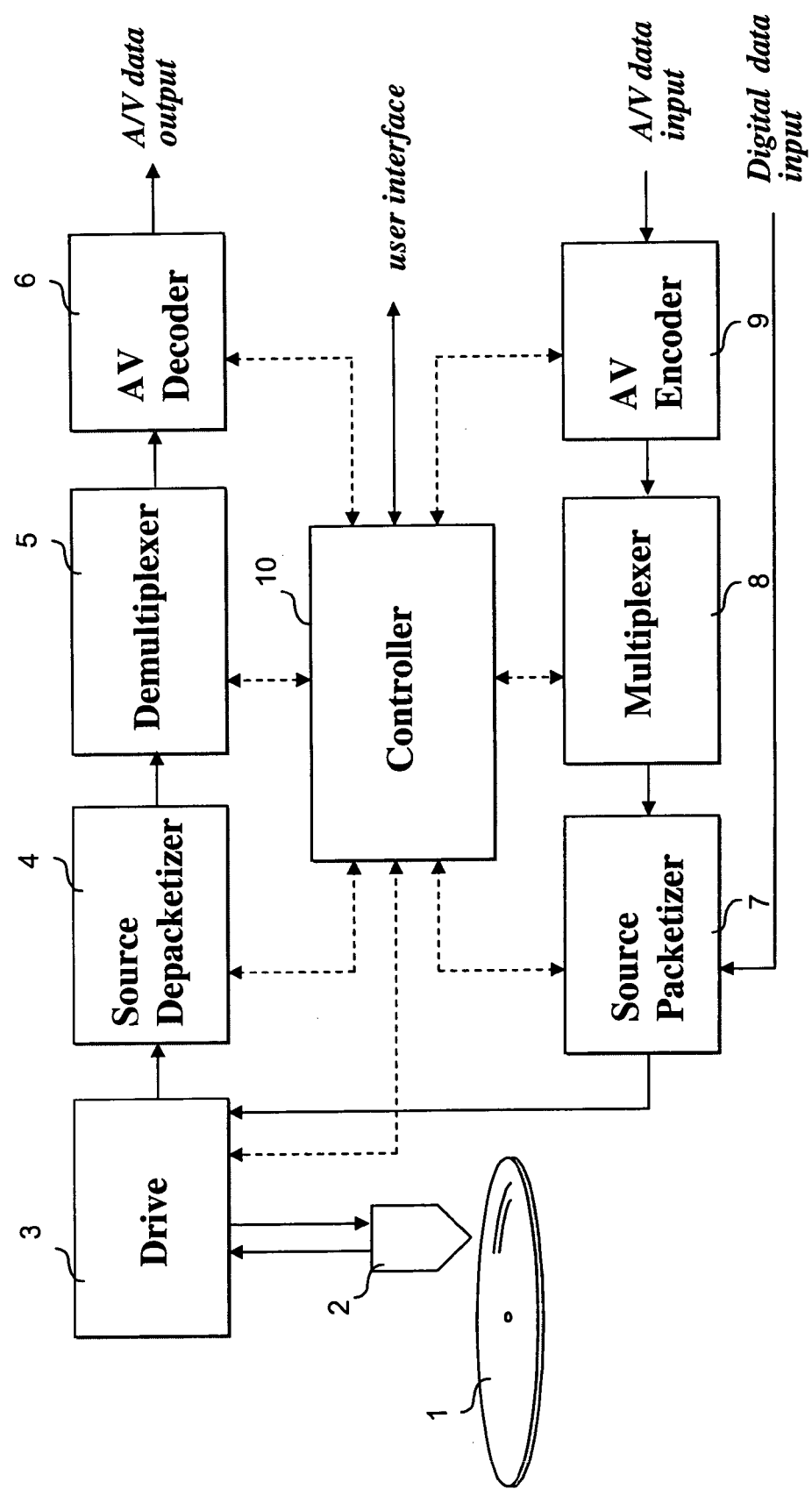
FIG. 11 illustrates a schematic diagram of an embodiment of an optical disk recording and reproduction apparatus of the present invention.

An optical disk reproducing apparatus outputs a clip of an A/V stream including one or more still images to, for example, a connected television set by referring to navigation information according to the present invention such as still marks, still indicators, still playitems, and sub-playitems. FIG. 11 illustrates a schematic diagram of an embodiment of an optical disk recording and reproducing apparatus according to the present invention. As shown, an AV encoder 9 receives and encodes data (e.g., movie video and audio data, only audio data, and/or still image data). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 14, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the data being recorded on the optical disk. For example, based on information received via the user interface (e.g., instruction set saved on disk, provided over an intranet or internet by a computer system, etc.) the controller 10 controls the drive 3 to record one or more of the data structures of FIGS. 1-10 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk. For example, as discussed above with respect to the embodiments of the present invention, a still image or still images may be reproduced from a clip of A/V stream based on the navigation information provided according to the embodiments of the present invention. Furthermore, an image or group) of images may be reproduced as a slideshow or portion of a slideshow. A slideshow may be a sequential show, random, browsable, etc.

For example, a browsable slideshow may be reproduced based on playlist marks defined as still marks. In this example, the controller 10 reproduces a playlist, and based on the navigation information in the playlist, the controller 10 reproduces a still image from a clip of A/V stream data. The controller 10 causes output of the still image until user input instructing the controller 10 to skip to the next or previous still image is received. The controller 10 then reproduces the next or previous still image. This next or previous image may be the next or previous still image referred to by the next or previous still mark in the playlist. This same browsable slideshow operation may be performed based on still indicators.

A browsable slideshow may also be reproduced based on the playitems or sub-playitems defined as still playitems or sub-playitems. Here, the controller 10 reproduces a still image referenced by a still playitem or sub-playitem in the playlist. The controller 10 causes output of the still image until user input instructing the controller 10 to skip to the next or previous still image is received. The controller 10 then reproduces the next or previous still image. This next or previous image may be the next or previous still image referred to by the next or previous still playitem or still sub-playitem in the playlist.

The reproduced source packets are received by a source depacketizer 4 and converted into a data stream (e.g., an MPEG-2 transport packet stream), A demultiplexer 5 demultiplexes the data stream into encoded data. An AV decoder 6 decodes the encoded data to produce the original data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 11 has been described as a recording and reproducing apparatus, it will be understood that only a recording or only a reproducing apparatus may be provided using those portions of FIG. 11 providing the recording or reproducing function.

Figure 12:
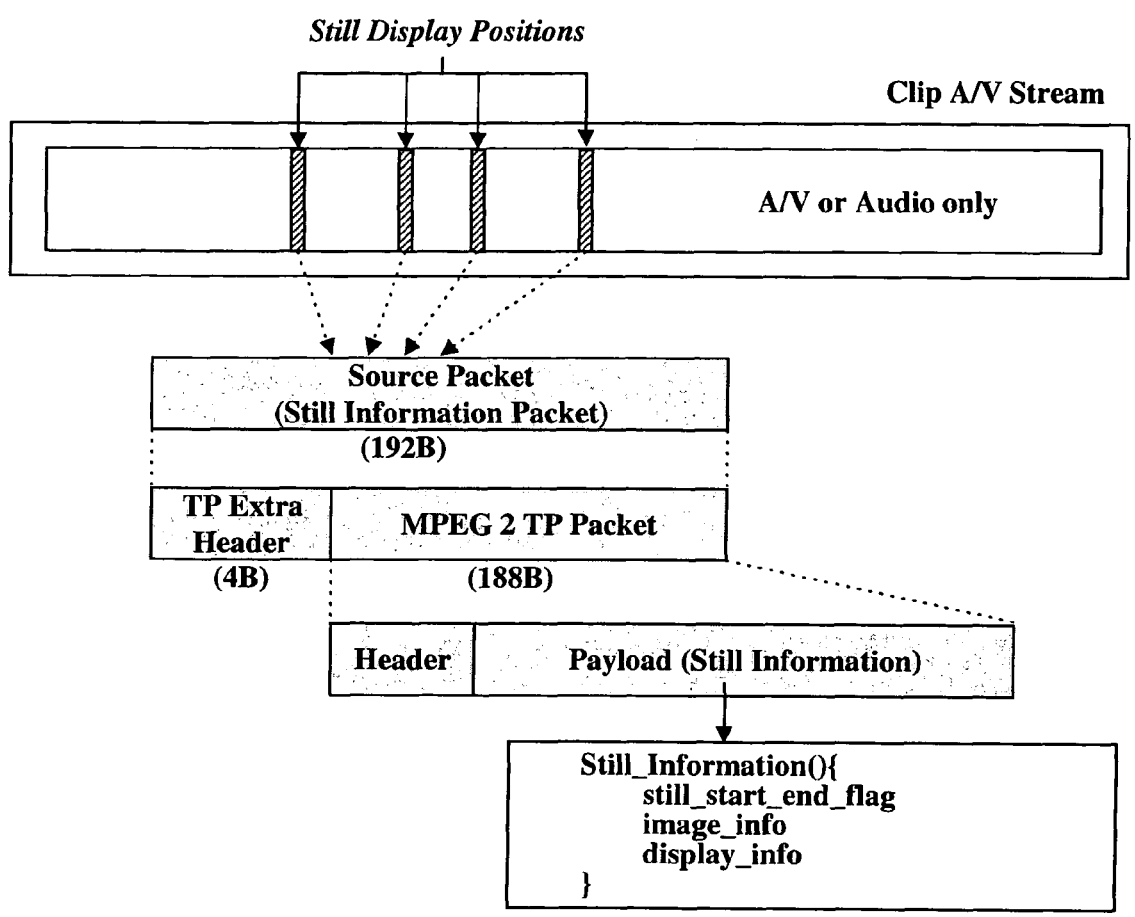
FIG. 12 illustrates a method of recording still information packets for identifying still display positions in accordance with an exemplary embodiment the invention.

Next, embodiments of a method for recording still information packets for allowing detection of still display positions will be described in detail. FIG. 12 illustrates a method of recording still information packets for detecting still display positions in accordance with the invention. In this method, source packets recorded at still display start and still display end positions contained in the clip A/V stream, which is pointed to by at least one type of navigation information among still marks, still indicators, still playitems, and sub-playitems, are defined as still information packets for identifying groups of still images.

A still information packet comprises a 4-byte TP (transport packet) extra header and a 188-byte MPEG2 TP (transport packet). The MPEG2 TP further comprises a packet header and a payload. As depicted in FIG. 12, the still information includes the fields of 'still_start_end_flag', 'image_info', 'display_info'. For example, if the flag 'still_start_end_flag' is '0', it indicates the still image start position. If the flag is '1', it indicates that the still image end position.

The field of 'image_info' indicates the attributes of the still image to be displayed and display characteristics, and the field of 'display_info' may include the display order, the display effect, and the display effect period, etc. The display order mode indicates, for example, a sequential still operation in which the still images are to be displayed sequentially or a random still operation in which the still images are to be displayed in a random manner. The display effect mode indicates the effect to be applied to the still image such as cut-in/cut-out or fade-in/fade-out. The display effect period field indicates the time duration for which the corresponding display effect is valid.

If the decoder contained in the VDP system such as FIG. 11 detects a source packet having the still information, that is, a still information packet, while reproducing a clip A/V stream, the optical disk reproducing apparatus displays the picture data as still images after suspending decoding of the clip A/V stream.

As will be appreciated from the forgoing disclosure, the present invention provides a recording medium having a data structure for managing still images recorded on a high-density recording medium (e.g., a high-density optical disk such as a BD-ROM). For example, the data structure allows for displaying still images in various ways.

As apparent from the above description, the present invention provides methods and apparatuses for recording a data structure on a high density recording medium for managing still images recorded on the recording medium.

The above description further provides methods and apparatus for reproducing still images recorded on a high density recording medium based on a data structure, also recorded on the high density recording medium, for managing the reproduction of still images.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A disc having a data structure for managing reproduction of at least one still image by a reproducing apparatus, comprising:
   a first navigation area storing a playlist file, the playlist file including at least one playitem, the at least one playitem indicating an in-point and out-point at which the reproducing apparatus is to reproduce a clip stream file, the clip stream file including video data to display the at least one still image, the at least one playitem including first duration information indicating whether the reproducing apparatus is to display the at least one still image for one of a finite and an infinite period of time; and
   a second navigation area storing a clip information file, the clip information file including mapping information between a presentation time and a unit of the clip stream file, such that the unit clip stream file is presented by the reproducing apparatus at the presentation time.

2. The disc of claim 1, wherein the playitem includes an indicator indicating whether to display a still image.

3. The disc of claim 1, wherein the playitem includes an indicator indicating a file name of the clip information file associated with the clip stream file.

4. The disc of claim 3, wherein the playitem includes an indicator indicating an STC id for a portion of the clip stream file indicated by the clip information file name.

5. The disc of claim 1, wherein the playlist file further includes at least one playlist mark pointing to the still image in the clip stream file.

6. The disc of claim 1, wherein the playitem includes a second duration information indicating a length of time to display the still image when the first duration information indicates to display the still image for a finite period of time.

7. The disc of claim 1, wherein the clip stream file having video data includes at least one of an I picture, B picture and P picture and the first navigation file indicates to display the at least one of the I picture, B picture and P picture in the clip file as the still image.

8. A method of reproducing at least one still image from a recording medium, comprising:
   reproducing a playlist file and a clip information file, the playlist file including at least one playitem, the at least one playitem indicating an in-point and out-point of a clip stream file, the clip stream file including video data to display the at least one still image, the at least one playitem including first duration information indicating whether to display the at least one still image for one of a finite and an infinite period of time, the clip information file including mapping information between a presentation time and a unit of the clip stream file.

9. An apparatus for reproducing at least one still image recorded on a recording medium, comprising:
   a pick up configured to reproduce data recorded on the recording medium;
   a controller configured to control the pick up to reproduce a playlist file and a clip information file, the playlist file including at least one playitem, the at least one playitem indicating an in-point and an out-point of a clip stream file, the clip stream file including video data to display the at least one still image, the at least one playitem including first duration information indicating whether to display the at least one still image for one of a finite and an infinite period of time, the clip information file including mapping information between a presentation time and a unit of the clip stream file.

10. A method of recording a data structure for managing reproduction of at least one still image, comprising:
    recording a playlist file including at least one playitem, the at least one playitem indicating an in-point and an out-point of a clip stream file including video data to display the at least one still image, the at least one playitem including first duration information indicating whether to display the at least one still image for one of a finite and an infinite period of time; and
    recording a clip information file including mapping information between a presentation time and a unit of the clip stream file.

11. An apparatus for recording at least one still image on a recording medium, comprising:
    a pick up configured to record data on the recording medium; and
    a controller configured to control the pick up to record a playlist file and a clip information file, the playlist file including at least one playitem, the at least one playitem indicating an in-point and out-point of a clip stream file including video data to display the at least one still image, the at least one playitem including first duration information whether to display the at least one still image for one of a finite and an infinite period of time, the clip information file including mapping information between a presentation time and a unit of the clip stream file.

12. The method of claim 8, wherein the playitem includes an indicator indicating whether to display a still image.

13. The method of claim 8, wherein the playitem includes a second duration information indicating a length of time to display the still image when the first duration information indicates to display the still image for a finite period of time.

14. The method of claim 8, wherein the clip stream file having video data includes at least one of an I picture, B picture and P picture and the first navigation file indicates to display the at least one of an I picture, B picture and P picture in the clip file as the still image.

15. The apparatus of claim 9, wherein the playitem includes an indicator indicating whether to display a still image.

16. The apparatus of claim 9, wherein the playitem includes a second duration information indicating a length of time to display the still image when the first duration information indicates to display the still image for a finite period of time.

17. The apparatus of claim 9, wherein the clip stream file having video data includes at least one of an I picture, B picture and P picture and the first navigation file indicates to display the at least one of an I picture, B picture and P picture in the clip file as the still image.

18. The method of claim 10, wherein the playitem includes an indicator indicating whether to display a still image.

19. The method of claim 10, wherein the playitem includes a second duration information indicating a length of time to display the still image when the first duration information indicates to display the still image for a finite period of time.

20. The method of claim 10, wherein the clip stream file having video data includes at least one of an I picture, B picture and P picture and the first navigation file indicates to display the at least one of an I picture, B picture and P picture in the clip file as the still image.

21. The apparatus of claim 11, wherein the playitem includes an indicator indicating whether to display a still image.

22. The apparatus of claim 11, wherein the playitem includes a second duration information indicating a length of time to display the still image when the first duration information indicates to display the still image for a finite period of time.

23. The apparatus of claim 11, wherein the clip stream file having video data includes at least one of an I picture, B picture and P picture and the first navigation file indicates to display the at least one of an I picture, B picture and P picture in the clip file as the still image.

24. The method of claim 8, wherein the recording medium is a read-only recording medium.

25. The method of claim 8, wherein the recording medium is a recordable recording medium.

26. The apparatus of claim 9, wherein the recording medium is a read-only recording medium.

27. The apparatus of claim 9, the recording medium is a recordable recording medium.

28. The method of claim 8, further comprising:
reproducing the clip stream file based on the playlist file and the clip information file.

29. The method of claim 10, further comprising:
recording the clip stream file including the video data to display the at least one still image.

30. The apparatus of claim 9, wherein the controller is configured to control the pick up to reproduce the clip stream file based on the playlist file and the clip information file.

31. The apparatus of claim 11, wherein the controller is configured to control the pick up to record the clip stream file including the video data to display the at least one still image.

32. The apparatus of claim 9, further comprising:
a source depacketizer configured to depacketize source packets into transport packets;
a demultiplexer configured to demultiplex the transport packets into encoded data; and
a decoder configured to decode the encoded data to an original data to be displayed.

33. The apparatus of claim 11, further comprising:
an encoder configured to encode data;
a multiplexer configured to multiplex the encoded data to create at least one transport stream; and
a source packetizer configured to packetize transport packets into source packets.

* * * * *